United States Patent Office 3,265,510
Patented August 9, 1966

3,265,510
MANUFACTURE OF CONFECTIONERY
PRODUCTS BY EXTRUSION
Otto B. Wurzburg, Whitehouse Station, N.J., and Walter G. Kunze, Catonsville, Md., assignors to National Starch and Chemical Corporation, New York, N.Y., a corporation of Delaware
No Drawing. Filed Nov. 13, 1963, Ser. No. 323,268
3 Claims. (Cl. 99—134)

This application is a continuation-in-part of application Serial Number 142,479, filed October 3, 1961, now abandoned.

The present invention relates to the manufacture of candy and other confectionery products and in particular to an improved method for manufacturing such confectionery products.

Starch and modified starches are used in the manufacture of various types of confections. These starches impart texture and body to the confections and give them a desirable feel in the mouth. The starch also serves the function of adjusting the speed of dissolution of the confectionery product.

In the preparation of some types of confections it has been the practice to cook an aqueous mixture of sugars, starch, and other additives, thereafter casting the mixture into molds. A considerable amount of water is initially required in most such processes in order to disperse or dissolve the ingredients of the mixture. After the dispersion is effected, part of the excess water is ordinarily removed by holding the cook at high temperatures to permit evaporation of enough water to achieve the solids content desired for casting. At this point the water content is ordinarily still higher than desired for the final product. In any case, the mixture is still fluid. The final gelling and formation of the solidified plastic confection is obtained only after casting and storing the mix in molds, which are generally formed from dry starch. These molds must usually be maintained in drying rooms at elevated temperatures for extended periods. It is seen that the formation of solid confections has heretofore involved costly and time-consuming storage in molds, to permit gelling and formation of the solid candy. Another disadvantage of the casting procedures heretofore utilized in making candy is that they do not lend themselves to continuous operation, since the casting into molds and the subsequent drying of the confection mixture normally require a discontinuous processing technique.

It is an object of this invention to provide a novel method of producing candy and other confectionery products. It is another object of this invention to provide a method for making confectionery products which drastically reduces the time formerly required to make such products. Another object is to provide a continuous process for the production of confectionery products. Still another object is the elimination of the cumbersome and dust-producing equipment now necessary for imprinting starch molds and re-drying the starch. Other objects and advantages of this invention will be apparent from the following discussion.

In accordance with the process of our invention, formed confectionery products are prepared from a mixture of sugar and an ungelatinized, essentially native starch having an amylose content no greater than about 35% by weight. Within the term "essentially native starch" we include any starch in its raw, untreated form, as well as any starch which has been modified, as for example by acid hydrolysis, oxidation or other chemical or physical treatment to an extent such that its fluidity value is less than 20.

It is well known that conventional starches, whether they be derived from corn, tapioca, potato, wheat or other sources, normally consist of two fractions, namely amylopectin and amylose. For any particular starch type the ratio of amylopectin to amylose is a fairly constant value. None of the conventional starches contain more than about 35% by weight of the amylose portion (at least one starch, waxy maize, contains essentially no amylose). While certain hybrid starches have been developed which contain 50% or more of the amylose fraction, such so-called high-amylose starches have properties which are in some respects radically different from the conventional starches containing no more than about 35% amylose, and the use of high-amylose starches in the production of confections is the subject of a separate application Serial No. 323,244, filed November 13, 1963. This present application is limited to confections wherein native conventional starches having an amylose content no greater than about 35% constitute the sole or major portion of the starch component in the formulation.

"Fluidity" is a term generally employed in the starch art to measure the degree to which a starch has been made more thin-boiling than the corresponding native, untreated starch. Starch, in its native, untreated, granular state, when heated in a given amount of water to a temperature beyond the gelatinization point of that particular starch (each starch type is known to have its own gelatinization temperature), results in a dispersion having a specific viscosity, usually quite heavy. When such a raw starch is treated chemically or physically, as by acid hydrolysis, dextrinization, oxidation, or certain esterification or etherification reactions, the resulting product, when heated in water, yields a less viscous (more fluid) product. The greater the "fluidity" value, as the figure is used throughout the starch industry, the greater has been the degree of conversion of the starch, and therefore the more fluid its aqueous dispersions. A fluidity value less than 20 with reference to a conventional starch represents a starch which, albeit slightly converted, is still essentially a native starch.

The mixture of starch and sugar is passed, in the presence of from about 14% to about 25% moisture, based on the weight of the total composition, through a heated extruder or other device which subjects the mixture to a combination of mixing, sufficient heat to gelatinize the particular starch employed, and sufficient pressure to force the resulting plastic mass from an orifice as a solid, formed, shape-retaining confection.

The starch used in our process may be obtained from any plant source, such for example as corn, tapioca, potato, sorghum or wheat, so long as the starch is in its essentially native, granular state, as defined above. Mixtures of two or more starches may also be used, but in any case the amylose content of the total amount of starch employed should be at least 15% of the total weight of said starch or starches.

When the starch, in combination with sugar and from 14% to 25% water, based on the weight of the total composition, is subjected to the heat and mixing action of a heated extruder or equivalent device, the starch is gelatinized and dispersed in situ, and the product emerges as a plastic solid which is shape-retaining and needs only to be cut to the desired size. There is no need for casting in molds and storing for days, as was the case with the syrupy fluids formed by hitherto employed processes. The economic advantages are self-evident.

The amount of moisture in the extrusion mixture should preferably be the minimal amount required to gelatinize and disperse the starch under the particular extrusion conditions employed, taking into account the particular starch used, the nature and proportions of the other ingredients, the temperature and pressure employed in the extrusion, and the nature of the particular candy desired. As stated, however, the amount of water is never greater than about 25%, based on the total weight of the composition. The minimum amount of water is about 14%. In calculating the amount of water in the composition, the moisture which may be inherently present in all of the components of the composition must be included. The use of such extremely low amounts of water in combination with the use of ungelatinized, essentially unconverted starch having a fluidity less than 20, and the subjection of the starch-sugar-moisture mixture to the heat-pressure-mixing action of an extruder, with the starch granules being gelatinized and dispersed within the extruder and thus absorbing even the small amount of water present, is what makes our improved product possible. As stated, our product leaves the extruder in the form of a solid plastic mass, which retains its shape and needs no storing in molds. Although in most cases post-extrusive drying is not necessary, it may be found desirable in some cases (especially when dealing with candies which are to undergo further treatment, such as coating with hot sugar or chocolate syrups) to dry for a short period. However, even in such cases the period of drying is not of the same magnitude as was necessitated by prior art processes. The amount of starch in the mixture to be extruded will depend upon the type of confection that is to be made, as well as the particular starch type used. Accordingly, the amount of starch, based on the weight of the entire formulation, may vary from about 10% to about 30%. Although converted starches may also be present, the essentially native starch must constitute a major proportion of the total starch used. Besides the starches and moisture, the remainder of the mixture is composed of sugars as well as minor amounts of desired additives such as coloring or flavoring agents, plasticizers, medicinal agents, and the like.

When we speak herein of sugars, we refer to all commonly used mono- and disaccharides and materials containing them, such as dextrose, starch syrup, levulose, sucrose, invert sugar and such polyhydric alcohols as sorbitol and mannitol which are characterized by a sweet taste. It might be noted that some of these products, such as sorbitol, have particularly interesting characteristics, such as their low melting point, good compatibility with starch, and their effect in helping to plasticize and disperse the mixture.

In preparing the mixture to be extruded, the practitioner may vary the order of mixing the ingredients to suit his convenience. Thus, the requisite amount of starch and sugar may be mixed together, and the water may then be combined with the starch-sugar mix. Additives may be added as desired. The resulting mixture, which may be in the form of a more or less heavy syrup, may be slightly heated (e.g. to about 120° F.) if desired, and then fed into the extruder by pump or other suitable device.

For the extrusion step, one may employ any device capable of subjecting the mixture to sufficient heat to gelatinize the starch, preferably with some shearing action, and sufficient pressure to force the mixture through an orifice or multiplicity of orifices. The orifice may have any desired size and shape required for the desired pattern. As a result of the combined heat, pressure and mixing action, the starch, sugar and other desired additives are effectively dispersed and mixed, in spite of the extremely low amounts of moisture present.

The extruder may be so devised that the first half of the extruder barrel contains heating elements which cook and gelatinize the starch, whereas the second half of the extruder barrel may be water-cooled, serving to remove a considerable amount of heat from the cooked mixture. Another variation consists in using two or more extruders in tandem, one to heat and the other to cool.

The temperature within the extruder barrel depends upon the amount and type of starch and sugars present in the mixture, as well as the moisture content. In order to realize the most favorable taste and color characteristics in the finished candy, the extrusion temperature should be as low as possible, consistent with the need to gelatinize the starch. Most formulations require temperatures ranging in the 320° F. to 370° F. area (as measured by a thermocouple inserted in the barrel wall), but the particular extrusion temperature required will be a simple matter for the practitioner to determine.

The temperature of the extruder die may be kept within the range of from 90° F. to 175° F., again depending upon the composition of the mixture. The pressures utilized within the extrusion mechanism will vary with the type of extruder and screw employed, the nature of the substance to be extruded, and the construction of the die, and pressures from 50 to 5,000 p.s.i. have been employed. It is understood, of course, that the pressure within the extruder is related to the temperature to be attained, in order to achieve gelatinization and dispersal of the particular starch type employed.

The ability of the starches employed in the confectionery formulations to produce the desired immediate stand-up (shape-retaining) properties may be further enhanced by chilling the confection as it leaves the extruder in the form of an endless ribbon, by depositing it upon a sugar or starch coated conveyor which moves through a channel in which refrigerated air enters at a temperature of about 40° F. The confection may remain in this chilling unit about 10 minutes, after which the confection emerges and is now cut by a rotary knife and coated as desired.

The following examples further illustrate the embodiment of our invention. Unless otherwise specified, all parts are given by weight.

EXAMPLE I

This example illustrates the preparation of confectionery products using the extrusion process of this invention, with native or essentially native granular starch.

In preparing the formulations listed below, we preferred to first blend the requisite amount of water with the starch. The sugar was then added to this mixture. There were then added the coloring agents and flavoring agents, although, it should be noted that these may be injected, if desired, later into the cooled section of the extruder barrel or die. The mixture was then heated to about 125° F. The resulting syrupy mass was then pumped into an extruder having a barrel length of 25 inches and having a screw with a diameter of 1½ inches which rotated at 125 r.p.m. The barrel temperature of the extruder was maintained within a range of from 300° to 400° F. and a pressure of 250 p.s.i. to 2,000 p.s.i., depending upon product composition. The cooked material was then passed from the heated barrel into a cooled barrel consisting of a water cooled cylinder in which a ¾″ conveying screw moved the material in contact with the cold cylinder walls into a shaping die. The temperature of the material in the shaping die was about 90° F. The confectionery material, as it left the die, was a solid plastic which could be cut, sanded, dusted, or treated in any other way desired by the practitioner.

FORMULATION 1

[Total moisture content of formulation—18.9%]

| Component | Moisture Content of Component, Percent | Amount of Component in Formulation (parts by weight) |
|---|---|---|
| Sucrose | 0.2 | 1,200 |
| Tapioca Starch | 13.0 | 575 |
| Water | 100.0 | 262 |
| Water solution of red food color | 100.0 | 10 |
| Corn syrup | 20.0 | 1,500 |
| Vanilla flavor | | 3 |

FORMULATION 2

[Total moisture content of formulation—17.9%]

| | | |
|---|---|---|
| Sucrose | 0.2 | 2,400 |
| Corn starch | 10.0 | 1,150 |
| Water | 100.0 | 525 |
| Water solution of green food dye | 100.0 | 25 |
| Corn syrup | 20.0 | 3,000 |
| Oil of spearmint | | 6 |

FORMULATION 3

[Total moisture content of formulation—18.2%]

| | | |
|---|---|---|
| Sucrose | 0.2 | 2,400 |
| Cornstarch [1] | 12.0 | 1,200 |
| Water | 100.0 | 525 |
| Black food color | | 15 |
| Corn syrup | 20.0 | 3,000 |
| Anise oil | | 6 |

FORMULATION 4

[Total moisture content of formulation—25.5%]

| | | |
|---|---|---|
| Sucrose | 1.0 | 1,250 |
| Tapioca starch | 11.4 | 1,400 |
| Water | 100.0 | 1,600 |
| Water solution of green dye | 100.0 | 25 |
| Corn Syrup Solids | 3.5 | 3,200 |
| Spearmint Oil | | 5 |

FORMULATION 5

[Total moisture content of formulation—14%]

| | | |
|---|---|---|
| Sucrose | 1.0 | 2,400 |
| Corn Starch | 9.8 | 1,300 |
| Water | 100.0 | 700 |
| Water solution of green dye | 100.0 | 25 |
| Corn Syrup Solids | 3.5 | 2,400 |

[1] This corn starch had been slightly converted so that its fluidity was still below 20.

In all cases the mixtures were extruded, as previously described, and emerged as solid, shape-retaining confections.

It is understood, of course, that any number of variations may be made in the composition and shape of the confections. Thus, for example, a novel candy bar may be formed by extruding a mixture of the type hereinabove described through a tube die, forming a candy shell, into which any desired filling may be injected. Other variations will be apparent. The scope of our invention encompasses the mixing of a granular, native untreated starch (or one which has a fluidity value no greater than 10), said starch containing no more than about 35% amylose by weight, with sugar and other additives, the total moisture content being between 14% and 25%; passing the mixture through an extruder or equivalent device capable of applying sufficient heat to gelatinize the starch in situ and to force the resulting solid plastic mass through an orifice. The product is shape-retaining and needs no casting and prolonged storage in molds, as was in fact required by the fluid syrups produced by prior art methods.

We claim:

1. The method of making a confectionery product which comprises taking a mixture of sugar and an ungelatinized, native starch having an amylose content no greater than about 35%, the amount of starch being from about 10% to about 30%, based on the weight of the total composition, said mixture containing from about 14% to about 25% moisture based on the weight of the total composition, and said native starch being in a non-dissolved form, and subjecting said mixture to simultaneous heat, pressure and mixing action of an extruder, said mixture being initially subjected in said extruder to heat which is at a temperature in the range of from about 320 to 370° F. and finally to heat at a temperature in the range of from about 90 to 175° F. while the pressure to which said mixture is subjected by the extruder is in the range of from about 50 to 5,000 p.s.i.; thereby effecting a dissolution of the starch and sugar with the simultaneous mixing and mastication of the mixture, and expelling the mixture from the extruder in the form of a solid, plastic, shape-retaining confectionery mass.

2. The method of making a confectionery product which comprises taking a mixture of sugar and an ungelatinized, native starch having an amylose content no greater than about 35%, the amount of starch being from about 10% to about 30%, based on the weight of the total composition, said mixture containing from about 14% to about 25% moisture, based on the weight of the total composition, and said native starch being in a non-dissolved form, and subjecting said mixture to the action of a heated extruder, and applying heat, pressure and shearing action on the mixture in and by the extruder, said mixture being initially subjected to heat in the barrel of said extruder to a temperature in the range of from about 320 to 370° F. and finally to heat in the die of said extruder to a temperature in the range of from about 90 to 175° F. while the pressure to which said mixture is subjected, in said extruder, is in the range of from about 50 to 5,000 p.s.i.; the heat, pressure and shearing action of the extruder on the mixture thereby effecting a dissolution of the starch and sugar with the simultaneous mixing and mastication of the mixture, and expelling the mixture from the extruder in the formation of a solid, plastic, shape-retaining confectionery mass.

3. The method of claim 1 in which the said native starch is one which has been converted to an extent such that its fluidity is less than 20.

References Cited by the Examiner

UNITED STATES PATENTS

| | | | |
|---|---|---|---|
| 1,725,171 | 8/1929 | Anderson | 99—82 |
| 2,197,919 | 4/1940 | Bowman. | |
| 2,256,190 | 9/1941 | Bowman | 107—54.6 |
| 2,726,960 | 12/1955 | Bolanowski | 99—134 |
| 2,847,311 | 8/1958 | Doumak et al. | 99—134 |
| 2,915,957 | 12/1959 | Bowman. | |
| 3,062,657 | 11/1962 | Vollink | 99—80 |
| 3,117,006 | 1/1964 | Wenger | 99—80 |

A. LOUIS MONACELL, *Primary Examiner.*

J. M. GOLIAN, *Assistant Examiner.*